(12) United States Patent
Bruns et al.

(10) Patent No.: US 6,413,407 B1
(45) Date of Patent: Jul. 2, 2002

(54) FLUTED ELECTROCHEMICAL MACHINING

(75) Inventors: Norbert Anthony Bruns; Edward Charles Bruns, both of Cincinnati; Thomas Howard Chamberlain, West Chester, all of OH (US)

(73) Assignee: Lehr Precision, Inc., Cincinnati, OH (US)

( * ) Notice: Subject to any disclaimer, the term of this patent is extended or adjusted under 35 U.S.C. 154(b) by 45 days.

(21) Appl. No.: 09/722,854

(22) Filed: Nov. 27, 2000

(51) Int. Cl.[7] .................................................. C25F 3/00
(52) U.S. Cl. .................... 205/651; 205/668; 204/224 M
(58) Field of Search ...................... 204/224 M; 205/651, 205/668

(56) References Cited

U.S. PATENT DOCUMENTS

| | | | |
|---|---|---|---|
| 3,499,830 A | 3/1970 | Haggerty et al. | |
| 3,769,194 A | 10/1973 | Haggerty | |
| 4,690,737 A | 9/1987 | Vishnitsky | |
| 5,004,529 A | 4/1991 | Vishnitsky | |
| 5,409,675 A | 4/1995 | Narayanan | |
| 6,267,869 B1 * | 7/2001 | MacLeod et al. | 204/224 M |

FOREIGN PATENT DOCUMENTS

EP    0 980 729 A1    2/2000

* cited by examiner

Primary Examiner—Arun S. Phasge
(74) Attorney, Agent, or Firm—Francis L. Conte (57) ABSTRACT

An ECM apparatus includes a fluted cathode tool for being driven through a tubular workpiece for electrochemically forming internal flutes therein. The cathode tool is sealed at one end for isolating electrolyte over the flutes thereof to seal against flow of the electrolyte past the tool and into the finished fluted bore.

30 Claims, 8 Drawing Sheets

FLUTED ELECTROCHEMICAL MACHINING

BACKGROUND OF THE INVENTION

The present invention relates generally to electrochemical machining, and, more specifically, to machining of long tubes.

Petroleum undergoes pyrolysis in cracking furnaces for producing useful products such as ethylene. The cracking furnace uses long tubes through which the petroleum is channeled and heated for the pyrolysis thereof.

Fluted process tubes are desired for increasing the available surface area and the corresponding rate of pyrolysis. Such fluted tubes may be formed by extruding suitably malleable metal, yet such metal is subject to undesirable creep at the high temperature required in the pyrolysis cracking process.

Accordingly, a nickel and chromium based superalloy having substantial high temperature creep strength is preferred for the process tubes. However, such high strength material cannot be extruded, and the flutes must be otherwise formed.

For example, electrochemical machining (ECM) may use a cathode tool in the desired shape of the internal flutes of the tube for electrochemically forming the flutes as an electrolyte flows between the tool and the tube when powered under high electrical current defining respective cathode and anode. ECM chemically erodes the initially circular unfinished surface defining the tube bore to form internal flutes being complementary with the external flutes of the cathode tool.

However, since the individual tubes are long, and the cathode tool must be driven completely through the tube, the electrolyte contained in the tube can effect stray ECM in the finished bore as the tool continues its travel through the tube. And, the electrolyte becomes heated during operation and affects the ECM process.

Accordingly, it is desired to provide an improved ECM apparatus and process for locally isolating the cathode tool during operation, as well as providing internal cooling of the tube in a preferred embodiment.

BRIEF SUMMARY OF THE INVENTION

An ECM apparatus includes a fluted cathode tool for being driven through a tubular workpiece for electrochemically forming internal flutes therein. The cathode tool is sealed at one end for isolating electrolyte over the flutes thereof to seal against flow of the electrolyte past the tool and into the finished fluted bore.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
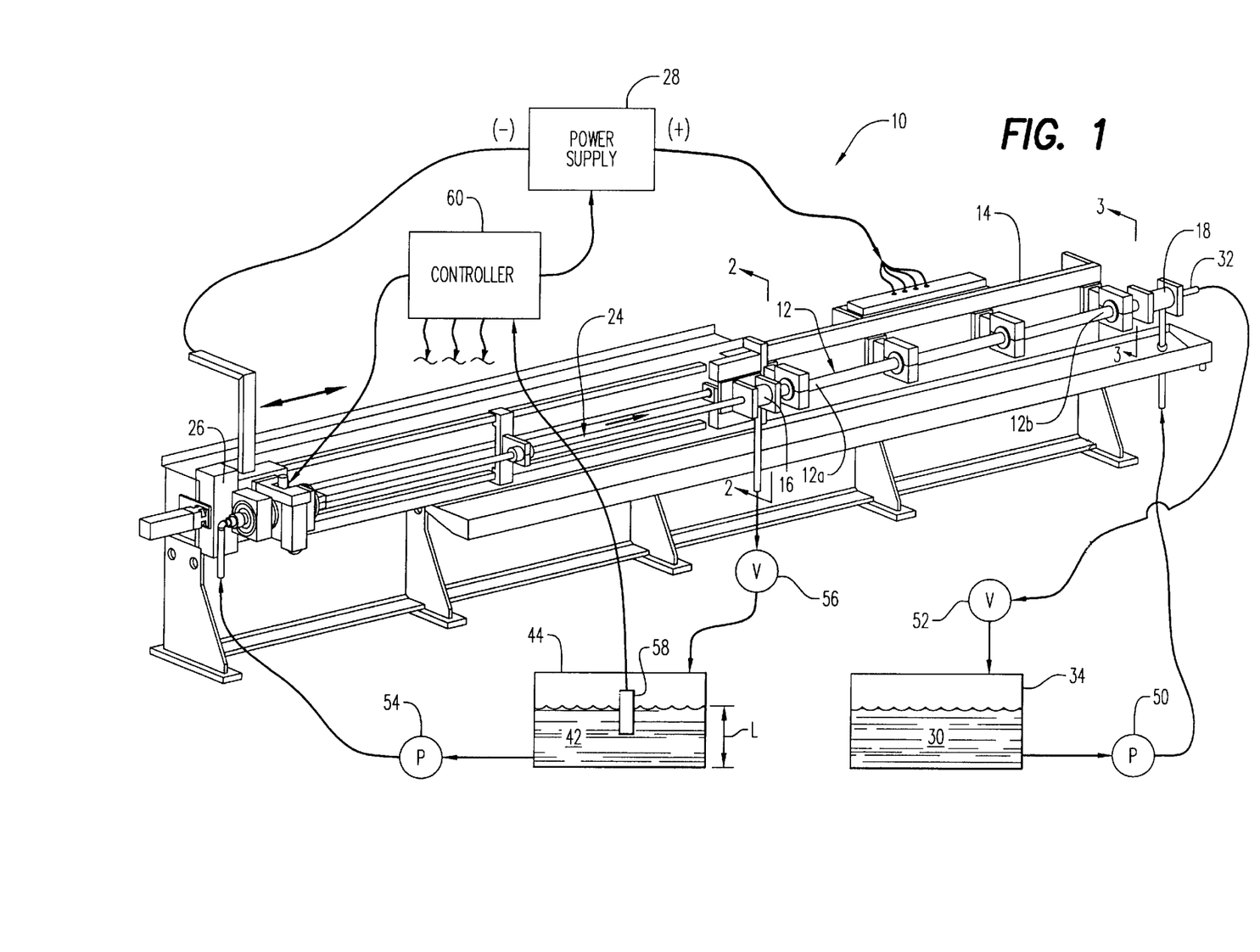
FIG. 1 is an isometric view of an ECM apparatus in accordance with a preferred embodiment of the present invention.

Illustrated schematically in FIG. 1 is apparatus or machine 10 for electrochemically machining (ECM) a tubular workpiece 12 in the exemplary form of a long heat transfer tube for use in petrochemical pyrolysis under high temperature. The workpiece is formed of a suitable superalloy metal having high creep strength at the intended elevated temperature, and typically includes nickel and chromium elements.

Means in the form of a frame 14 are provided for fixedly supporting the workpiece either horizontally as shown, or vertically, or in any suitable orientation as desired. In the exemplary embodiment illustrated in FIG. 1, the frame 14 includes suitable clamps for mounting the long workpiece horizontally straight along its full length between its proximal and distal ends 12a,b at axially opposite ends thereof. For example, the tube may be about 3 meters long, and is supported at four locations along its length.

An entry manifold 16 is fixedly mounted to the frame for being sealingly joined to the workpiece proximal end 12a. And, an exit manifold 18 is also fixedly joined to the frame for being sealingly joined to the workpiece distal end 12b.

Figure 2:
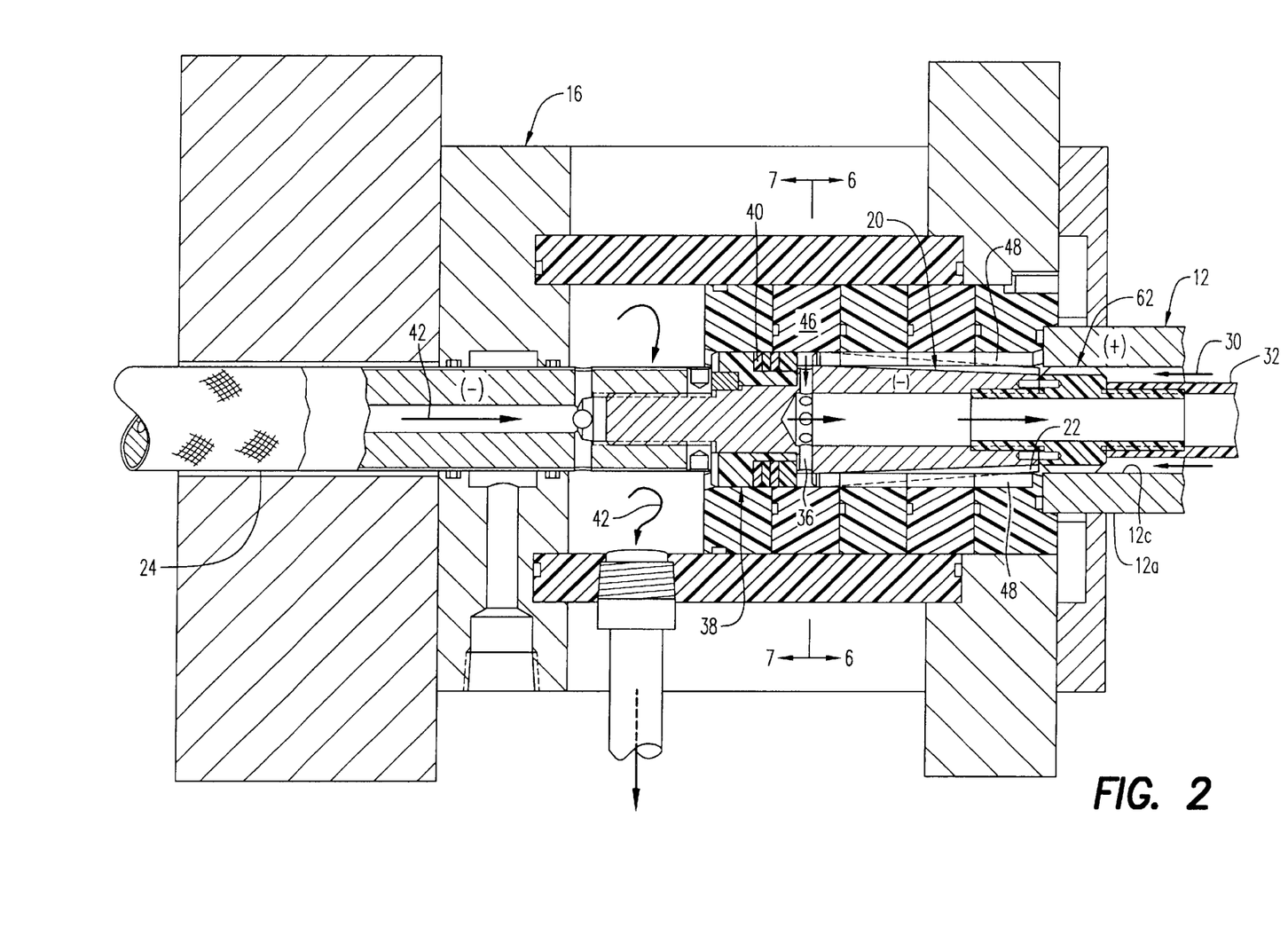
FIG. 2 is an axial sectional view through an entry manifold of the apparatus illustrated in FIG. 1 and taken generally along line 2—2 showing the initial position of a fluted cathode tool entering the proximal end of a tubular workpiece.
Figure 3:
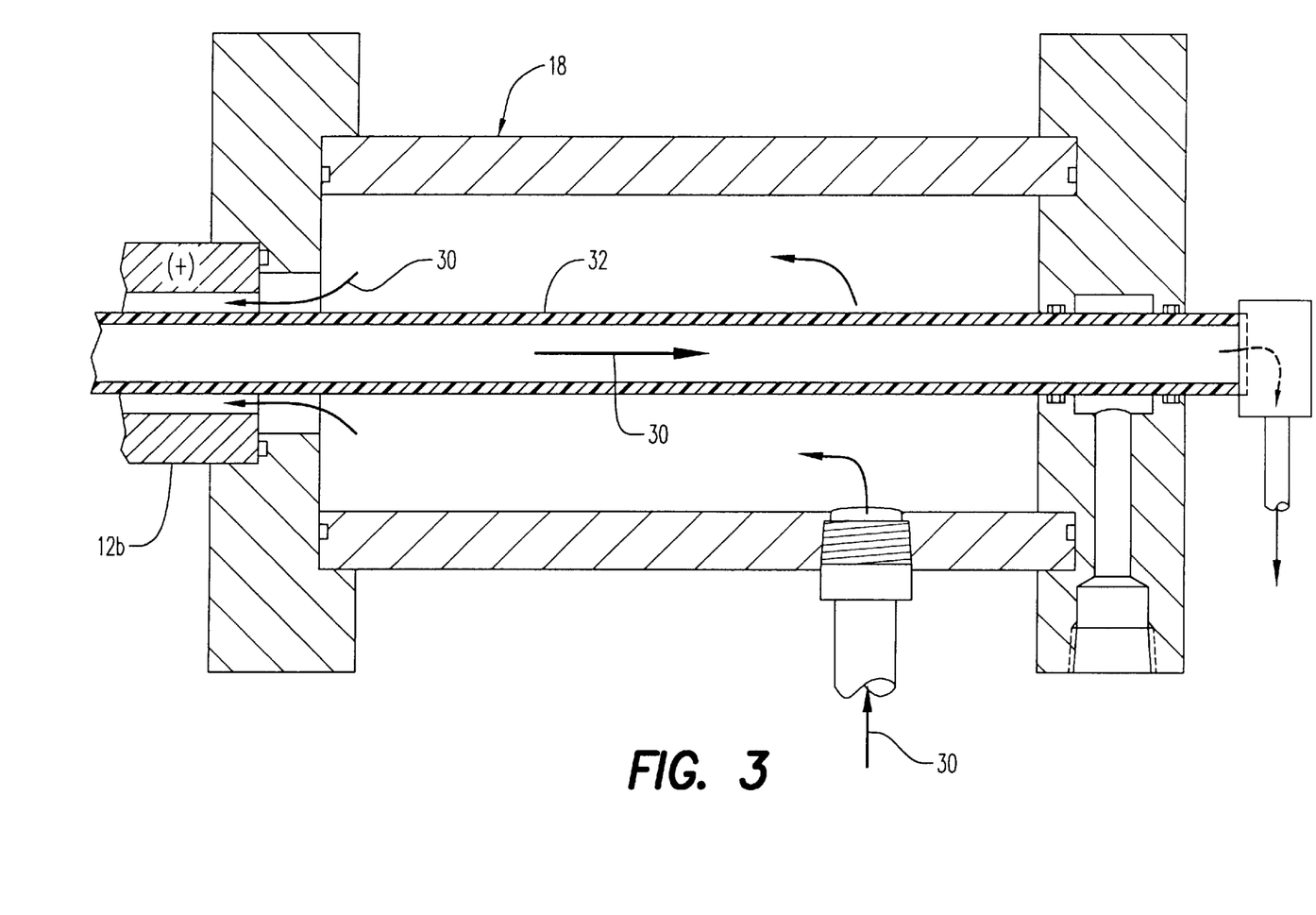
FIG. 3 is an axial sectional view of an exit manifold at the distal end of the workpiece illustrated in FIG. 1 and taken generally along line 3—3.

The entry manifold 16 is illustrated in more detail in FIG. 2 and includes a central chamber in which an electrode tool 20 is initially housed for being carried through the workpiece. FIG. 3 illustrates in more particularity the exit manifold 18 also having a central chamber sized for receiving the electrode tool after being driven completely through the workpiece.

Figure 4:
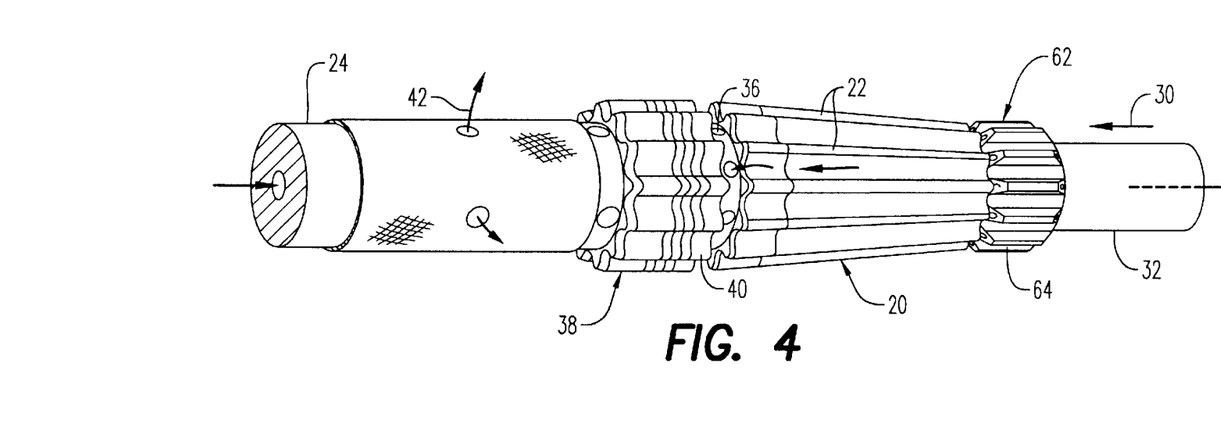
FIG. 4 is an isometric view of the cathode tool illustrated in FIG. 2 in accordance with an exemplary embodiment.

The electrode tool 20 is illustrated in more detail in FIG. 4 and includes a plurality of circumferentially adjoining external flutes 22 extending radially outwardly and axially between opposite forward and aft ends thereof. The flutes are preferably sinusoidal around the circumference of the tool and define corresponding axial grooves therebetween. And, the tool is suitably tapered along its length with an outer diameter converging between the aft and forward ends of the tool, with the forward end of the tool being positioned for first entering the proximal end of the workpiece followed in turn by the larger aft end of the tool.

As shown in FIG. 1, means in the form of an aft drive tube 24 are suitably mounted to the frame 14, with the tube including a distal end fixedly joined to the tool aft end as illustrated in more detail in FIG. 2 in coaxial alignment therewith. For example, the electrode tool 20 is preferably formed of a suitable electrical conductor such as copper, and has a threaded spindle at its forward end for threadingly engaging an internally threaded attachment socket at the distal end of the drive tube 24.

In this way, an electrically conducting path is provided between the electrode tool and the drive tube, which may be formed of any suitable electrically conducting metal such as copper or stainless steel. In the preferred embodiment, the drive tube is provided with a thin coating of fiberglass electrical insulation for insulating it from the supporting frame.

As additionally shown in FIG. 1, the driving means also include a drive carriage 26 suitably supporting the aft end of the drive tube and mounted to the frame 14 for axial translation of the tube and attached tool through the proximal end of the workpiece. The drive tube 24 is preferably longer than the workpiece for driving the electrode tool completely therethrough, and may be additionally supported between its two opposite ends in a suitable sliding support attached to the frame.

The drive carriage 26 may have any conventional configuration for translating the drive tube 24 horizontally along the length of the frame 14 for pushing the electrode tool through the workpiece at any desired and controlled translation rate.

Means in the form of a power supply 28 are suitably electrically joined to the workpiece 12 and the drive tube 24 for carrying an electrical current through the electrode tool 20 during operation. The power supply may be electrically joined to the workpiece 12 through the supporting clamps therefor so that the workpiece defines a positive anode.

The power supply may be suitably joined to the drive tube 24 through the drive carriage 26 at the aft end thereof for providing a ground or negative potential at the drive tube so that the electrode tool defines a cathode. The power supply may be configured for providing suitable power for the electrochemical machining process including up to about 20,000 amps at 25 volts D.C., and the workpiece and drive tube are electrically insulated from the supporting frame 14 in any suitable manner.

Referring again to FIG. 1, the exit manifold 18 defines in part suitable means for circulating or channeling a liquid electrolyte 30 through the distal end 12b of the workpiece as illustrated in more detail in FIG. 3.

The electrolyte channeling means preferably includes an electrolyte flow tube 32 having a distal end fixedly joined to the forward end of the electrode tool 20 as illustrated in FIG. 2. The flow tube initially extends through the inside of the workpiece and out its distal end, and through the exit manifold 18 to which it is sealingly joined with a suitable sliding seal.

As shown in FIG. 1, an electrolyte reservoir or tank 34 is provided for storing the electrolyte 30 therein, and is suitably joined in flow communication in a closed loop with the exit manifold 18 and the exposed end of the flow tube 32 for circulating the electrolyte to and from the electrode tool inside the workpiece.

As shown in FIG. 2, the electrode tool 20 is preferably hollow at its forward end, and is joined in flow communication with the distal end of the flow tube 32. The tool further includes a plurality of return apertures 36 extending radially through the sidewall of the tube adjacent the forward ends of the tool flutes 22.

As initially shown in FIG. 2, the workpiece 12 includes an unfinished generally circular inner surface 12c defining an unfinished bore of the tube which requires electrochemical machining. By channeling the electrolyte 30 between the tool flutes 22 and the workpiece bore, and powering the workpiece and tool, electrochemical machining will erode the bore inner surface to conform with the specific profile of the tool flutes 22 as they are driven through the tube.

The tapered electrode tool effects a form of broaching in which the forward or leading end of the flutes begins the ECM process which removes material from the inner surface of the tube to a correspondingly larger diameter as the aft or trailing end of the tool is finally driven through the workpiece. Tapering the tool permits a substantial increase in axial travel feedrate during the ECM process.

Figure 5:
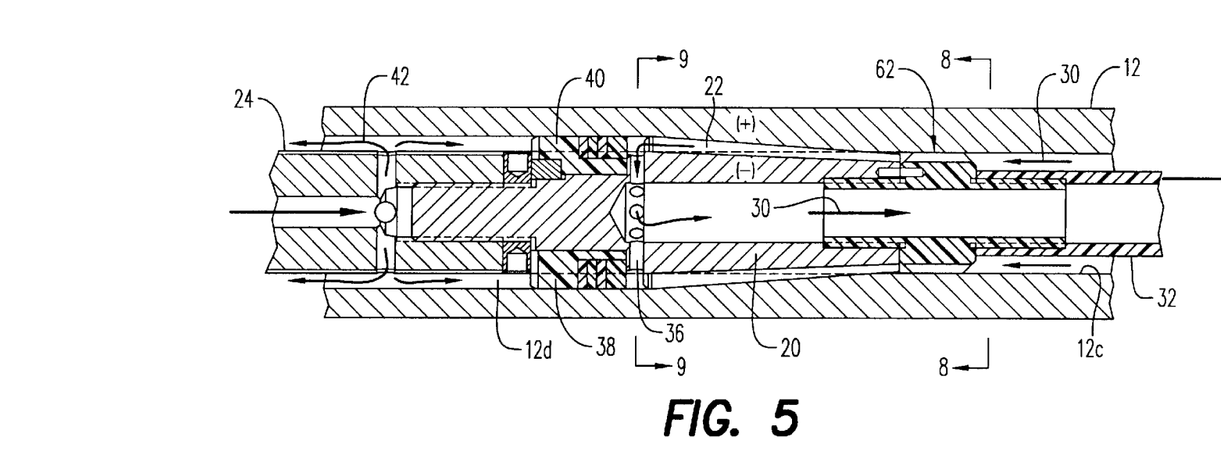
FIG. 5 is an axial sectional view of the cathode tool illustrated in FIG. 2 during electrochemical machining inside the workpiece.

FIG. 5 illustrates the ECM process at an intermediate location in the workpiece 12 between its opposite ends in which the electrode tool 20 electrochemically machines complementary internal flutes 12d in the inner surface of the workpiece defining the finished fluted bore thereof. In this way, the unfinished bore 12c has a smooth tubular profile which is eroded under ECM to form the finished fluted bore 12d. The transition from unfinished to finished bore occurs over the axial length of the tapered electrode tool by the convoluted flutes 22 therearound.

However, as soon as the fluted bore is finished, it is desired to isolate the electrolyte therefrom to prevent any further electrochemical machining of the finished bore as the cathode continues its long travel through the workpiece. Excessive or extraneous electrochemical machining of the finished bore is undesirable because it will change the desired final dimensions thereof and degrade the desired surface finish.

Accordingly, means in the form of an aft inner guide 38 are fixedly joined to the aft end of the electrode tool behind the flutes 22 thereof for sealing the tool to the workpiece and seal against flow of electrolyte past the aft guide to isolate the flow of electrolyte in the unfinished workpiece bore 12c as a tool is carried therethrough. As initially shown in FIG. 4, the aft guide 38 includes a plurality of circumferentially adjoining external flutes 40 defining respective axial grooves therebetween. The guide flutes 40 are suitably larger than the tool flutes 22 to complement the fluted bore 12d and provide an effective fluid seal therebetween.

The aft guide 38 is specifically sized for sealing the finished fluted bore 12d following electrochemical machining of the unfinished bore, and slides axially with the tool being driven by the drive tube 24. The aft guide 38 is fixedly joined to the electrode tool adjacent its aft end for being carried therewith, and is complementary with the fluted bore 12d for sealing electrolyte flow therethrough.

As shown in section in FIG. 2, the aft guide 38 may have any suitable form such as a plastic electrical insulator, and preferably includes an axial stack of fluted seal rings formed of a suitable material such as Neoprene, Delrin, or urethane for example. In this way, the multiple fluted sealing rings can tightly slide against the finished bore to provide an effective wiping seal therewith for isolating the electrolyte flow and preventing contamination of the finished fluted bore.

In FIG. 2, the aft guide 38 is configured to be mounted axially over the threaded spindle at the forward end of the tool, and a retaining nut is threadingly joined to the spindle for clamping together the tubular insulator and seal rings of the aft guide assembly in an annular rabbet formed immediately behind the aft ends of the tool flutes 22.

As initially shown in FIG. 1, the entry manifold 16 defines part of suitable means for circulating or channeling a fluid 42 inside the entry manifold and behind the aft end of the electrode tool. The aft guide 38 is disposed inside the entry manifold for separating the fluid from the electrolyte. The fluid 42 may be used for various functions such as, for example, being a washing fluid such as water for washing stray electrolyte from the finished fluted bore 12d during electrochemical machining. And, the water may also be used to cool the tool and workpiece from heat buildup during ECM.

As shown in FIG. 2, the drive tube 24 preferably has a center bore communicating with radial outlet holes at the distal end thereof attached to the cathode tool. The drive tube extends outwardly from the back end of the entry manifold with a sliding sealed fit therethrough.

As shown in FIG. 1, a fluid reservoir or tank 44 is provided for storing the fluid 42 therein, such as the washing water. The fluid tank is joined in flow communication with the entry manifold 16 and with the exposed end of the drive tube 24 mounted in the carriage 26 for channeling the fluid in circulation through the entry manifold. In this way, the fluid 42 may be circulated inside the entry manifold and is isolated by the aft guide 38 from the electrolyte on the opposite side thereof.

In the preferred embodiment illustrated in FIG. 2, the aft guide 38 cooperates with an outer guide 46 which is fixedly joined inside the entry manifold to the proximal end of the workpiece 12 mounted therein. The outer guide 46 includes a plurality of circumferentially adjoining internal flutes 48 with corresponding grooves therebetween. The internal flutes 48 are complementary with the aft guide flutes 40 for providing an effective sliding seal therebetween which isolates the electrolyte on one side of the aft guide and isolates the fluid 42 on the opposite side of the aft guide.

The outer guide 46 illustrated in FIG. 2 is preferably formed of an axial stack of fluted disks sealingly joined to each other and to the proximal end of the workpiece, by O-rings for example. The outer guide is preferably formed of an electrically insulating plastic material and initially supports the electrode tool therein by engagement with the attached aft guide 38.

Figure 6:
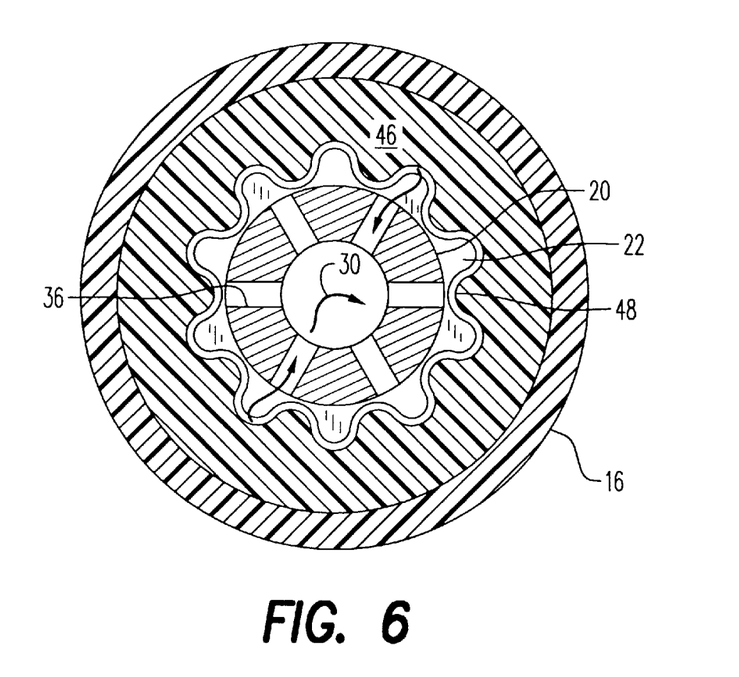
FIG. 6 is a radial sectional view through the cathode tool illustrated in FIG. 2 disposed inside an outer guide in the entry manifold and taken along line 6—6.

FIG. 6 is a forward facing view of the electrode tool 20 initially mounted inside the outer guide 46 at the entrance of the workpiece. The tool flutes 22 are slightly smaller than the flutes 48 of the outer guide to provide a small radial gap therebetween through which the electrolyte 30 is channeled over the tool.

Figure 7:
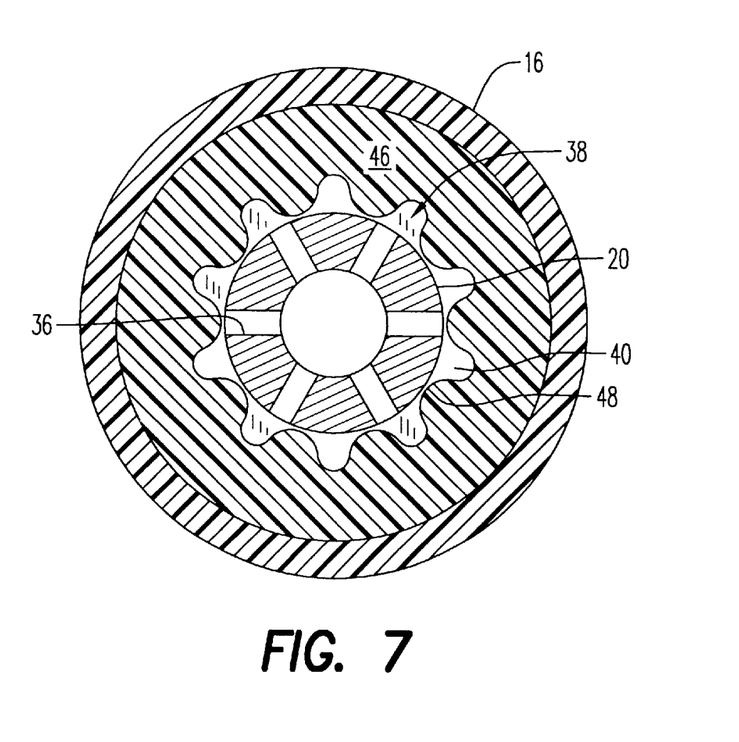
FIG. 7 is a radial sectional view like FIG. 5 but facing aft along line 7—7 in FIG. 2.

FIG. 7 is an aft facing view behind the tool flutes illustrating the cooperation of the aft guide 38 inside the outer guide 46. The external flutes 40 of the aft guide 38 are sized to fill the grooves between the internal flutes 48 of the outer guide and provide an effective sliding seal therewith.

As shown in FIG. 5, after the aft guide 38 enters the workpiece 12, the flutes 40 of the aft guide fill the adjoining grooves between the machined flutes 12d of the finished bore in the same manner as illustrated in FIG. 7 to continue the sliding seal between the aft guide and the finished fluted bore of the workpiece for maintaining isolation of the electrolyte 30 from the fluid 42.

As additionally shown in FIG. 5, the outer diameter of the drive tube 24 is slightly smaller than the inner diameter of the finished fluted bore 12d, and the fluid 42 is free to flow axially between the finished internal flutes 12d of the workpiece.

Correspondingly, the flow tube 32 is preferably smaller in outer diameter than the inner diameter of the unfinished workpiece bore 12c for channeling the electrolyte both outside and inside the hollow flow tube. In the preferred embodiment, the electrolyte 30 enters the exit manifold 18 illustrated in FIG. 3 for flow in the annulus between the flow tube and the workpiece bore to reach the electrode tool 20 illustrated in FIG. 5. The electrolyte then flows between the flutes 22 of the tool and the inner surface of the workpiece for carrying electrical current between the workpiece and tool for electrochemically machining the desired fluted inner surface of the workpiece.

The electrolyte is discharged from the tool flutes 22 at the aft end of the tool and flows radially inwardly through the return apertures 36 which are in flow communication with the hollow forward portion of the tool 20 for discharging the electrolyte therethrough. The hollow tool 20 is disposed in flow communication with the center bore of the flow tube 32 which returns the electrolyte to the exposed proximal end of the flow tube as illustrated in FIG. 3 which in turn is disposed in flow communication with the electrolyte tank 34 illustrated in FIG. 1.

In an alternate embodiment, the electrolyte flowpath may be reversed so that the electrolyte is received through the bore of the flow tube, and is then discharged over the tool flutes outside the flow tube.

In the preferred embodiment illustrated in FIG. 1, a first pump 50 is disposed in flow communication by a conduit between the electrolyte tank 34 and the inlet of the exit manifold 18 for providing the electrolyte under suitable pressure for flow past the electrode tool. A first valve 52 is disposed in flow communication by a conduit between the discharge end of the flow tube 32 and the electrolyte reservoir 34 for controlling back pressure of the returning electrolyte in a closed, recirculating loop with the reservoir.

And, a suitable heat exchanger and filters (not shown) are provided in flow communication with the electrolyte reservoir for cooling and cleaning the electrolyte for reuse in a conventional manner.

The fluid channeling means illustrated in FIG. 1 similarly includes a second pump 54 joined in flow communication by a conduit joining the fluid reservoir 44 to the exposed end of the drive tube 24 for pumping the fluid through the drive tube and into the entry manifold 16. A second valve 56 is joined in flow communication by a conduit between the entry manifold 16 and the fluid reservoir 42 for controlling back pressure of the fluid inside the entry manifold 16 in a closed, recirculating loop with the reservoir.

Since the electrolyte 30 is channeled under pressure to the electrode tool 20 illustrated in FIG. 5 on the forward side of the aft guide 38, that pressure provides a driving force for undesirable leakage of small amounts of the electrolyte between the aft guide and the fluted workpiece. Accordingly, it is desired to provide the fluid 42 on the back side of aft guide 38 with a sufficient pressure to offset the pressure of the electrolyte and minimize or prevent any leakage of electrolyte past the aft guide 38.

Accordingly, the fluid pump 54 may be operated for channeling the fluid under a controlled pressure into the entry manifold 16 to substantially offset the pressure of the electrolyte 30 on the opposite side of the aft guide. However, it is difficult to accurately measure pressure on opposite sides of the aft guide during operation due to the high electrical current environment existing during electrochemical machining.

Accordingly, a float or level sensor 58 is mounted in the fluid reservoir 44 for measuring level L of the fluid therein. Since the fluid channeling means are preferably effect a closed loop system, pressure may be balanced on opposite sides of the aft guide 38 by measuring level of the fluid in the reservoir 44 and maintaining that level substantially constant therein.

Since leakage of the electrolyte 30 or fluid 42 in either direction past the aft guide 38 will correspondingly increase or decrease the level of the fluid in the reservoir 44, the differential pressure across the aft guide may be minimized by monitoring level of the reservoir 44 and adjusting the pump 54 or valve 56 for maintaining the level thereof within a desired range. This may be done manually, or, the sensor 58 may be operatively joined to a controller 60 which controls the entire operation of the ECM apparatus. The controller 60 may have any conventional form such as a digitally programmable computer operatively joined to the various components of the apparatus for controlling their various functions.

In the preferred embodiment illustrated in FIGS. 4 and 5, the electrode tool 20 includes the fluted aft guide 38 fixedly joined to the aft end thereof for not only sealing the aft end of the electrode tool to the inner bore of the workpiece, but also providing a centering function for the tool as it is translated during operation.

Figure 9:
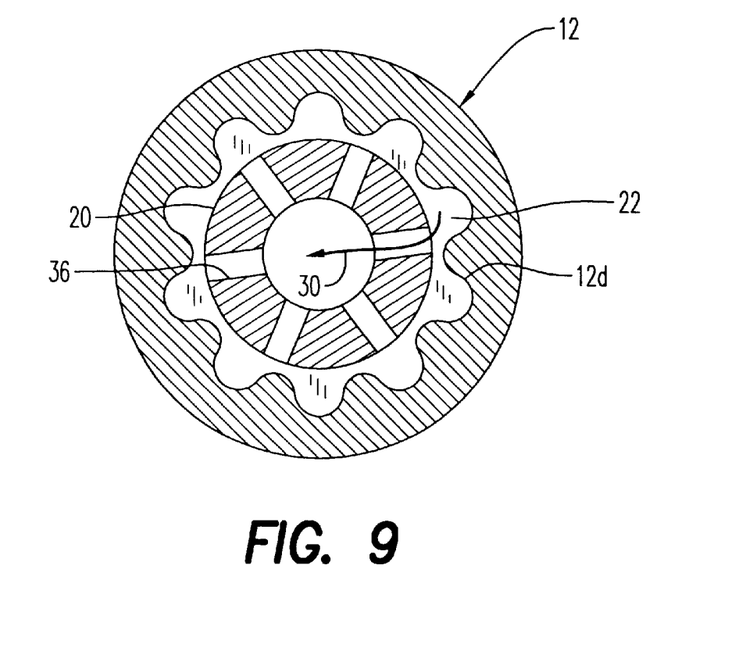
FIG. 9 is a radial sectional view through the workpiece illustrated in FIG. 5 facing forward toward the fluted tool and taken along line 9—9.

The electrode tool 20 preferably also includes a fluted forward guide 62 fixedly joined to the forward end thereof and cooperates with the aft guide 38 for centering the fluted tool inside the bore of the workpiece for maintaining a substantially small uniform gap radially between the tool flutes 22 and the inner surface of the workpiece during electrochemical machining. FIG. 9 illustrates the finished fluted bore 12d with the corresponding small gap between the flutes of the electrode tool and the flutes formed in the inner surface of the workpiece.

Figure 8:
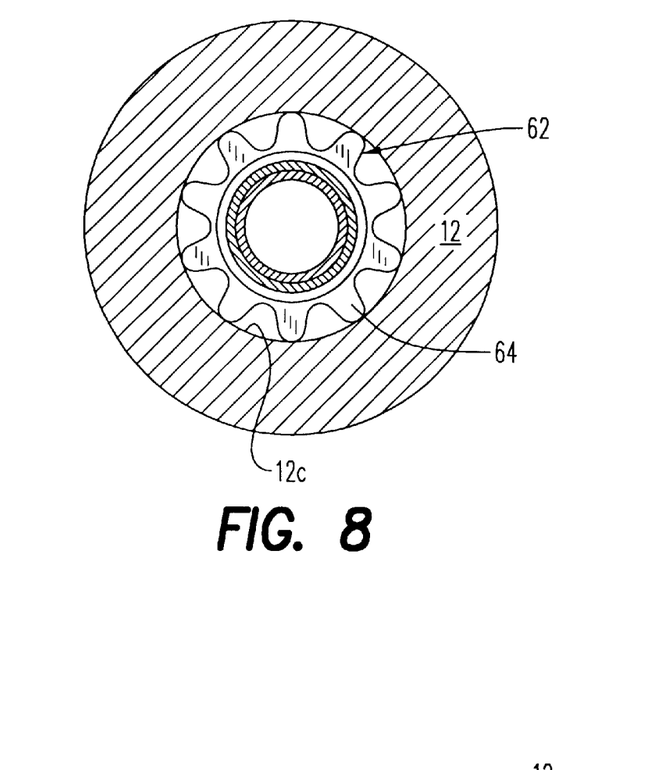
FIG. 8 is a radial sectional view through the tube illustrated in FIG. 5 facing aft toward a front guide supporting the cathode tool and taken along line 8—8.

As shown in FIGS. 5 and 8, the forward guide 62 includes a plurality of circumferentially adjoining flutes 64 defining axial grooves therebetween which are sized in outer diameter to slidingly engage the inner diameter of the unfinished bore 12c. The forward and aft guides thusly contact the unfinished and finished bores, respectively, of the workpiece for centering the electrode tool during operation axially therebetween, with the grooves between the flutes 64 permitting flow of the electrolyte 30 therethrough.

The forward guide 62 is preferably hollow and has externally threaded spindles at both ends thereof which engage complementary threaded internal sockets at the forward end of the electrode tool 20 and the distal end of the flow tube 32. In this way, the flow tube 32 and forward guide 62 may be threadingly attached in turn to the electrode tool with a common center bore therein for channeling the electrolyte therethrough.

Since the forward guide 62 and flow tube 32 are not provided to carry electrical power, they may be formed of any suitable electrically insulating material. For example, the forward guide may be a suitable plastic like Delrin for example. And, the flow tube may be a suitable plastic such as PVDF, commercially available from R & G Sloan Manufacturing, Los Angeles, Calif.

Figure 10:
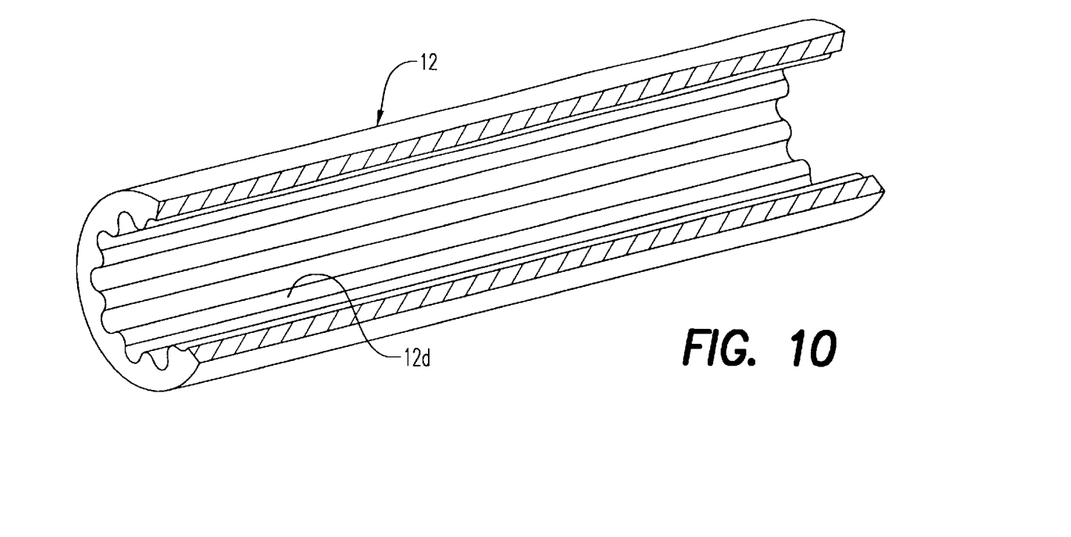
FIG. 10 is an isometric, sectional view of a portion of the workpiece illustrated in FIG. 5 after electrochemical machining of the internal flutes therein.

As shown in FIG. 4, the flutes 22, 40, and 64 of the electrode tool and aft and forward guides are axially straight and circumferentially aligned with each other to collectively provide straight flutes for forming an axially straight fluted bore 12d as illustrated in FIG. 10.

As illustrated in FIG. 1, the drive carriage 26 may be configured for simply translating and pushing the drive tube 24 longitudinally through the workpiece 12 for forming the straight flutes therein.

Figure 11:
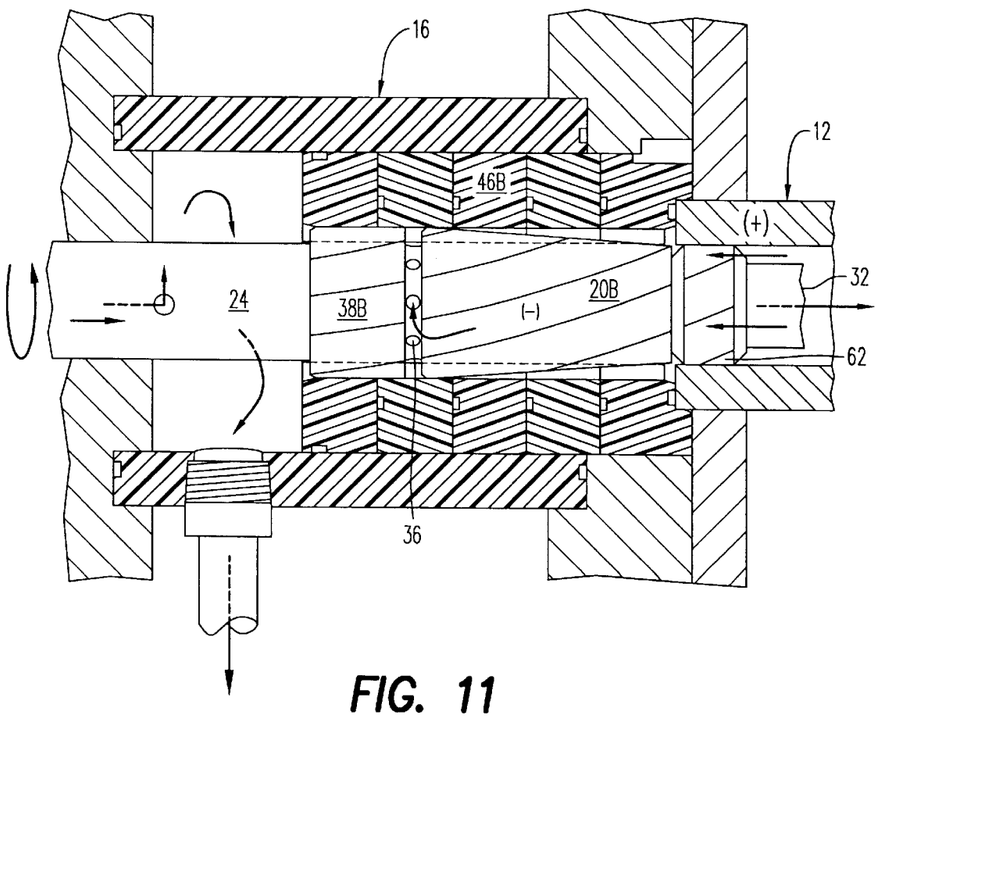
FIG. 11 is an axial sectional view through the entry manifold of FIG. 2 having spiraling flutes in the cathode tool in accordance with an alternate embodiment of the present invention.
Figure 12:
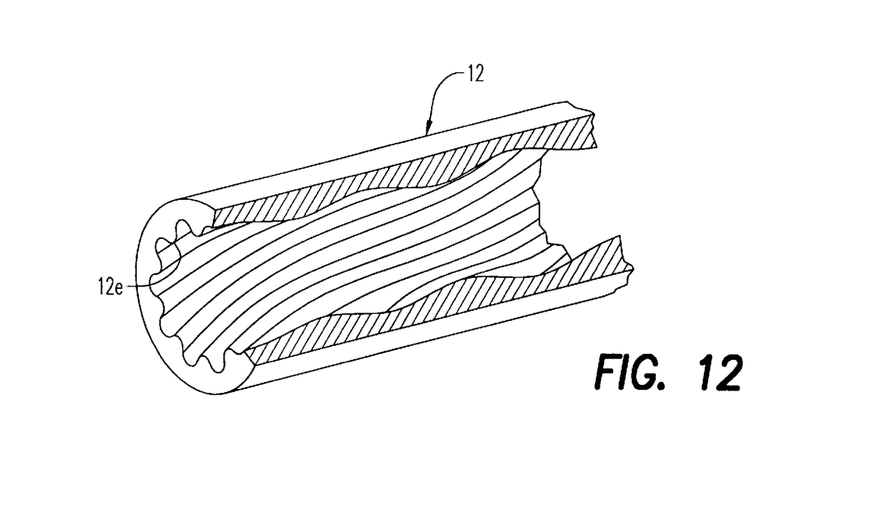
FIG. 12 is an isometric, sectional view of a portion of the workpiece illustrated in FIG. 11 after forming of spiraling internal flutes therein.

FIG. 11 illustrates an alternate embodiment of the present invention in which the flutes of the electrode tool 20B and those of the aft guide 38B spiral circumferentially for electrochemically machining spiraled or rifled flutes 12e in the workpiece 12 as illustrated in FIG. 12.

Similarly, the flutes of the outer guide 46B as illustrated in FIG. 11 are correspondingly spiraled to match the spiraled flutes of the electrode tool 20B and aft guide 38B and provide cam surfaces for self-rotating the tool as the tool is driven axially through the workpiece. The flutes 64 of the forward guide 62 may be straight or spiraled as desired for channeling the electrolyte.

The carriage 26 illustrated in FIG. 1 may be used to simply axially translate the drive tube and attached electrode tool 20B, with reaction of the spiraled flutes in the outer guide 46B causing rotary motion of the tool as it electrochemically machines the inner bore of the workpiece. As the spiraled tool forms the spiraling flutes in the workpiece, the spiraled flutes of the aft guide 38B may then engage the finished flutes in the bore for continuing the self-rotation of the electrode tool through the workpiece to complete the rifling thereof.

In the preferred embodiment illustrated in FIG. 1, the drive carriage 26 includes a suitably powered rotary table thereon through which the proximal end of the drive tube is fixedly mounted. The drive tube may then be suitably rotated during operation to match the rotation of the spiraled electrode tool as it is driven through the workpiece.

In the rotating embodiment of the drive tube 24 illustrated in FIG. 1, the exposed end of the drive tube is preferably joined to the fluid reservoir 44 using a suitable rotary coupling, and a similar rotary coupling is provided at the exposed end of the flow tube. And, the power supply 28 may be joined to the rotating drive tube 24 using electrical slip rings in any conventional form for carrying the required high electrical current through the drive tube to the electrode tool.

Figure 13:
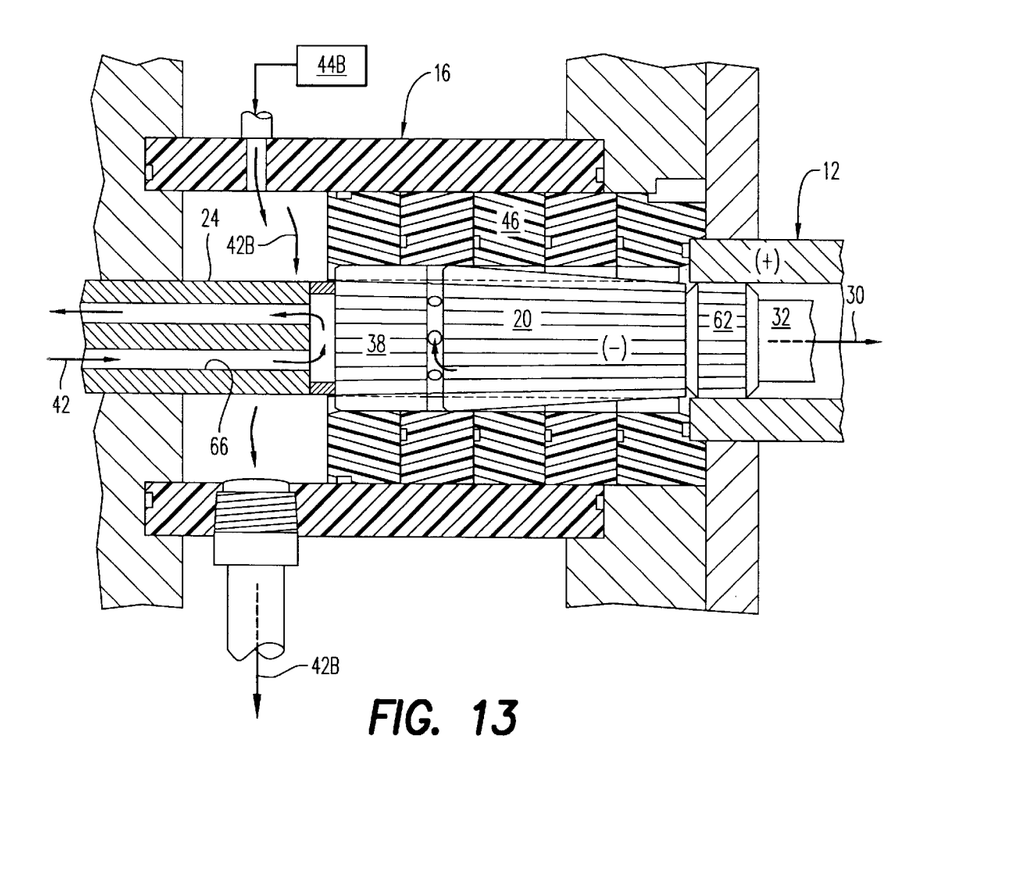
FIG. 13 is an axial sectional view through the entry manifold of FIG. 2 in accordance with an alternate embodiment for channeling a gas through the manifold in isolation from the electrolyte.

FIG. 13 illustrates another embodiment of the present invention in which the fluid is a gas 42B such as argon which is suitably circulated through the entry manifold 16 from a suitable gas tank 44B. Argon or any other suitable gas may be used for displacing air, which includes oxygen, from inside the entry manifold 16 and inside the workpiece 12 as it is being electrochemically machined to prevent further stray machining of the finished bore behind the aft guide 38. For some applications, it may be desirable to use an inert gas to flood the entry manifold and finished side of the workpiece instead of liquid or water.

Correspondingly, the drive tube 24 preferably includes an internal cooling circuit 66 therein suitably joined to the fluid reservoir 44 illustrated in FIG. 1 for circulating inside the drive tube the fluid 42 in the form of cooling water. In this way, cooling is provided on one side of the electrode tool 20, while the heat generating electrochemical machining is conducted on the opposite side thereof. And, the separately channeled gas 42B may be used for protecting the finished fluted bore from additional electrochemical machining caused by any stray electrolyte.

Various forms of the fluid 42,42B in liquid or gas form may be channeled into the entry manifold 16 for washing or cleaning away any stray electrolyte to protect the machined fluted bore of the workpiece, while additionally providing internal cooling of the electrode tool and workpiece as electrochemical machining is effected.

The electrode tool 20 itself may have any suitable form for fluting or rifling the internal bore of the workpiece irrespective of its material composition, including high creep strength superalloy materials. The tapered electrode tool provides a correspondingly large feedrate for rapidly machining the fluted bore. The finished portion of the bore is protected from stray electrochemical machining as the remainder of the unfinished bore undergoes electrochemical machining. And, internal cooling of the workpiece and tool is provided by the introduction of the fluid on one side of the aft guide independently of the electrolyte on the opposite side thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An apparatus for electrochemically machining an unfinished inner surface defining an axial bore of a tubular workpiece, comprising:
    means for supporting said workpiece;
    an electrode tool including a plurality of circumferentially adjoining flutes having grooves therebetween extending between axially opposite forward and aft ends thereof;
    means for driving said tool axially through said workpiece bore between proximal and distal ends of said workpiece;
    means for powering said workpiece and tool to effect an anode and cathode, respectively;
    means for channeling a liquid electrolyte through said bore to surround said tool for electrochemically machining said unfinished bore to form a fluted bore behind said tool aft end; and
    means for sealing said tool adjacent said aft end thereof to said workpiece to seal against flow of said electrolyte therepast to isolate flow of said electrolyte in said unfinished bore as said tool is carried therethrough.

2. An apparatus according to claim 1 wherein said sealing means are fixedly attached to said tool adjacent said aft end thereof for being carried therewith, and are complementary with said fluted bore for sealing electrolyte flow therethrough.

3. An apparatus according to claim 2 further comprising means for channeling a fluid behind said tool aft end, with said sealing means being effective for separating said fluid from said electrolyte at said tool aft end.

4. An apparatus according to claim 3 wherein said fluid is a washing fluid for washing stray electrolyte from said fluted bore as said tool is carried through said unfinished bore during electrochemical machining.

5. An apparatus according to claim 4 wherein said fluid channeling means are effective for channeling said fluid under pressure to substantially offset pressure of said electrolyte on opposite sides of said sealing means.

6. An apparatus according to claim 3 wherein said sealing means comprise an aft guide fixedly joined to said tool aft end, and including a plurality of circumferentially adjoining guide flutes having grooves therebetween, with said guide flutes being larger than said tool flutes to seal said fluted bore.

7. An apparatus according to claim 6 wherein said sealing means further comprise an outer guide fixedly joined to said workpiece proximal end, and including a plurality of circumferentially adjoining internal flutes having grooves therebetween, with said internal flutes being complementary with said aft guide flutes for sealing against flow of said electrolyte and fluid therebetween.

8. An apparatus according to claim 7 wherein:
    said flutes of said tool and said aft guide spiral circumferentially for electrochemically machining spiral flutes in said workpiece; and
    said flutes of said outer guide similarly spiral for self-rotating said tool as said tool is carried axially through said workpiece.

9. An apparatus according to claim 3 wherein said tool is hollow in forward part for channeling said electrolyte therethrough.

10. An apparatus according to claim 9 wherein said tool further comprises a fluted aft guide fixedly joined to said aft end thereof and sized to seal said fluted bore during electrochemical machining, and a fluted forward guide fixedly joined to said forward end thereof and sized to slidingly engage said unfinished bore, and said forward and aft guides support said fluted tool axially therebetween for centering said tool inside said workpiece for maintaining a substantially uniform gap between said tool flutes and said workpiece inner surface during electrochemical machining.

11. An apparatus according to claim 3 wherein said tool driving means comprise:
    a drive tube fixedly joined to said tool aft end at said sealing means;
    a drive carriage supporting said drive tube for axially translating said tube and attached tool through said proximal end of said workpiece; and
    said powering means are electrically joined to said drive tube to effect said tool cathode.

12. An apparatus according to claim 11 wherein said drive carriage is further configured for rotating said drive tube to rotate said tool through said workpiece bore.

13. An apparatus according to claim 11 wherein said fluid channeling means comprise:
    an entry manifold for being sealingly joined to said workpiece proximal end to initially contain said tool therein, with said drive tube extending outwardly therefrom; and
    a fluid tank for storing said fluid, and joined in flow communication with said manifold for channeling said fluid therethrough.

14. An apparatus according to claim 13 wherein said fluid is water for washing stray electrolyte from said fluted bore as said tool is carried through said unfinished bore during electrochemical machining.

15. An apparatus according to claim 14 wherein said fluid channeling means further comprise:
    a pump joined in flow communication between said reservoir and drive tube for pumping said water into said manifold;
    a valve joined in flow communication between said manifold and reservoir for controlling back pressure in said manifold; and a level sensor mounted in said reservoir for measuring level of said water therein to maintain a substantially constant level thereof.

16. An apparatus according to claim 13 wherein said fluid is a gas for being channeled through said manifold to displace air therein.

17. An apparatus according to claim 16 wherein said drive tube includes a cooling circuit therein for circulating a coolant therethrough.

18. An apparatus according to claim 3 wherein said electrolyte channeling means comprise:
an exit manifold for being sealingly joined to said workpiece distal end to receive said tool therein after being carried through said workpiece;
a flow tube fixedly joined to said tool forward end, and extending through said exit manifold; and
an electrolyte tank for storing said electrolyte, and joined in flow communication with said exit manifold and said flow tube for circulating said electrolyte to and from said tool.

19. An apparatus according to claim 18 wherein:
said tool is hollow at said forward end thereof, and is joined in flow communication with said flow tube;
said tool includes a return aperture extending radially therethrough axially between said sealing means and said tool flutes; and
said flow tube is smaller than said workpiece bore for channeling said electrolyte both outside and inside said flow tube.

20. An apparatus for electrochemically machining an unfinished inner surface defining an axial bore of a tubular workpiece, comprising:
a frame for supporting said workpiece;
an electrode tool including a plurality of circumferentially adjoining flutes having grooves therebetween extending axially between opposite forward and aft ends thereof;
an aft guide fixedly joined to said tool aft end, and including a plurality of circumferential adjoining guide flutes having grooves therebetween for providing a seal with said workpiece to isolate flow of said electrolyte in said unfinished bore as said tool is carried therethrough;
a drive tube fixedly joined to said tool aft end behind said aft guide;
a drive carriage supporting said drive tube for axially translating said tube and attached tool through said proximal end of said workpiece;
a power supply electrically joined to said electrode tool for defining a cathode thereat, with said workpiece defining an anode electrically joined to said power supply; and
means for channeling a liquid electrolyte through said bore to surround said electrode tool for electrochemical machining said unfinished bore to form a fluted bore behind said tool aft end, with said aft guide providing a seal to seal against leakage of said electrolyte therepast.

21. An apparatus according to claim 20 further comprising an outer guide fixedly joined to said workpiece proximal end, and including a plurality of circumferentially adjoining internal flutes having grooves therebetween, with said internal flutes being complementary with said aft guide flutes for sealing against flow of said electrolyte therebetween.

22. An apparatus according to claim 21 further comprising:
an entry manifold for being sealingly joined to said workpiece proximal end to initially contain said tool therein, with said drive tube extending outwardly therefrom; and
a fluid tank for storing a fluid, and joined in flow communication with said entry manifold for channeling said fluid therethrough.

23. An apparatus according to claim 22 wherein said fluid is water for washing stray electrolyte from said fluted bore as said tool is carried through said unfinished bore during electrochemical machining.

24. An apparatus according to claim 22 wherein said electrolyte channeling means comprise:
an exit manifold for being sealingly joined to said workpiece distal end to receive said tool therein after being carried through said workpiece;
a flow tube fixedly joined to said tool forward end, and extending through said exit manifold; and
an electrolyte tank for storing said electrolyte, and joined in flow communication with said exit manifold and said flow tube for circulating said electrolyte to and from said tool.

25. An apparatus according to claim 24 wherein:
said tool is hollow at said forward end thereof, and is joined in flow communication with said flow tube;
said tool includes a return aperture extending radially therethrough axially between said sealing means and said tool flutes; and
said flow tube is smaller than said workpiece bore for channeling said electrolyte both outside and inside said flow tube.

26. A method for electrochemically machining an unfinished inner surface defining an axial bore of a tubular workpiece, comprising:
supporting said workpiece;
driving an electrode tool axially through said workpiece bore between proximal and distal ends of said workpiece, with said electrode tool including a plurality of circumferentially adjoining flutes having grooves therebetween extending between axially opposite forward and aft ends thereof;
powering said workpiece and tool to effect an anode and cathode, respectively;
channeling a liquid electrolyte through said bore to surround said tool for electrochemically machining said unfinished bore to form a fluted bore behind said tool aft end; and
sealing said tool adjacent said aft end thereof to said workpiece to seal against flow of said electrolyte therepast to isolate flow of said electrolyte in said unfinished bore as said tool is carried therethrough.

27. A method according to claim 26 further comprising sealing said fluted bore behind said traveling tool to seal against flow of said electrolyte out said workpiece proximal end.

28. A method according to claim 27 further comprising channeling a fluid behind said tool aft end and sealed from flow of said electrolyte.

29. A method according to claim 28 further comprising channeling said fluid into said fluted bore for washing stray electrolyte therefrom during electrochemical machining of said unfinished bore.

30. A method according to claim 28 further comprising channeling said fluid under pressure behind said electrode tool to substantially offset pressure of said electrolyte thereat.

* * * * *